United States Patent [19]

Grimes

[11] Patent Number: 5,256,356
[45] Date of Patent: Oct. 26, 1993

[54] METHOD FOR FORMING AN OPENING IN A CONTAINER

[75] Inventor: George A. Grimes, Conyers, Ga.

[73] Assignee: Dolco Packaging Corp., Sherman Oaks, Calif.

[21] Appl. No.: 928,558

[22] Filed: Aug. 11, 1992

Related U.S. Application Data

[62] Division of Ser. No. 698,628, May 10, 1991, Pat. No. 5,162,123.

[51] Int. Cl.$^5$ ............... B29C 43/40; B29C 51/32
[52] U.S. Cl. .................... 264/154; 264/156; 264/163
[58] Field of Search ............ 264/154, 156, 163; 425/292, 289, 290

[56] References Cited

U.S. PATENT DOCUMENTS

| | | | |
|---|---|---|---|
| 3,845,187 | 10/1974 | Dahlberg | 264/154 |
| 4,108,941 | 8/1978 | Kermoian | 264/154 |
| 4,446,088 | 5/1984 | Daines | 425/292 |
| 4,612,153 | 9/1986 | Mangla | 264/154 |
| 4,877,391 | 10/1989 | Baston et al. | 264/156 |
| 5,019,313 | 5/1991 | Warburton | 264/154 |
| 5,085,571 | 2/1992 | Congleton | 264/154 |

Primary Examiner—Jay H. Woo
Assistant Examiner—Duane S. Smith
Attorney, Agent, or Firm—Robbins, Berliner & Carson

[57] ABSTRACT

A method for forming an opening in a container in which upper and lower keys, each having a shear surface, are mounted in the upper and lower mold portions, respectively, such that the shear surfaces face each other in substantially parallel alignment to form an opening in the container as the mold portions travel towards each other. The lower key is mounted about a pivot pin and spring oriented such that its shear surface rotates along an axis normal to a path of travel of the mold portions.

2 Claims, 2 Drawing Sheets

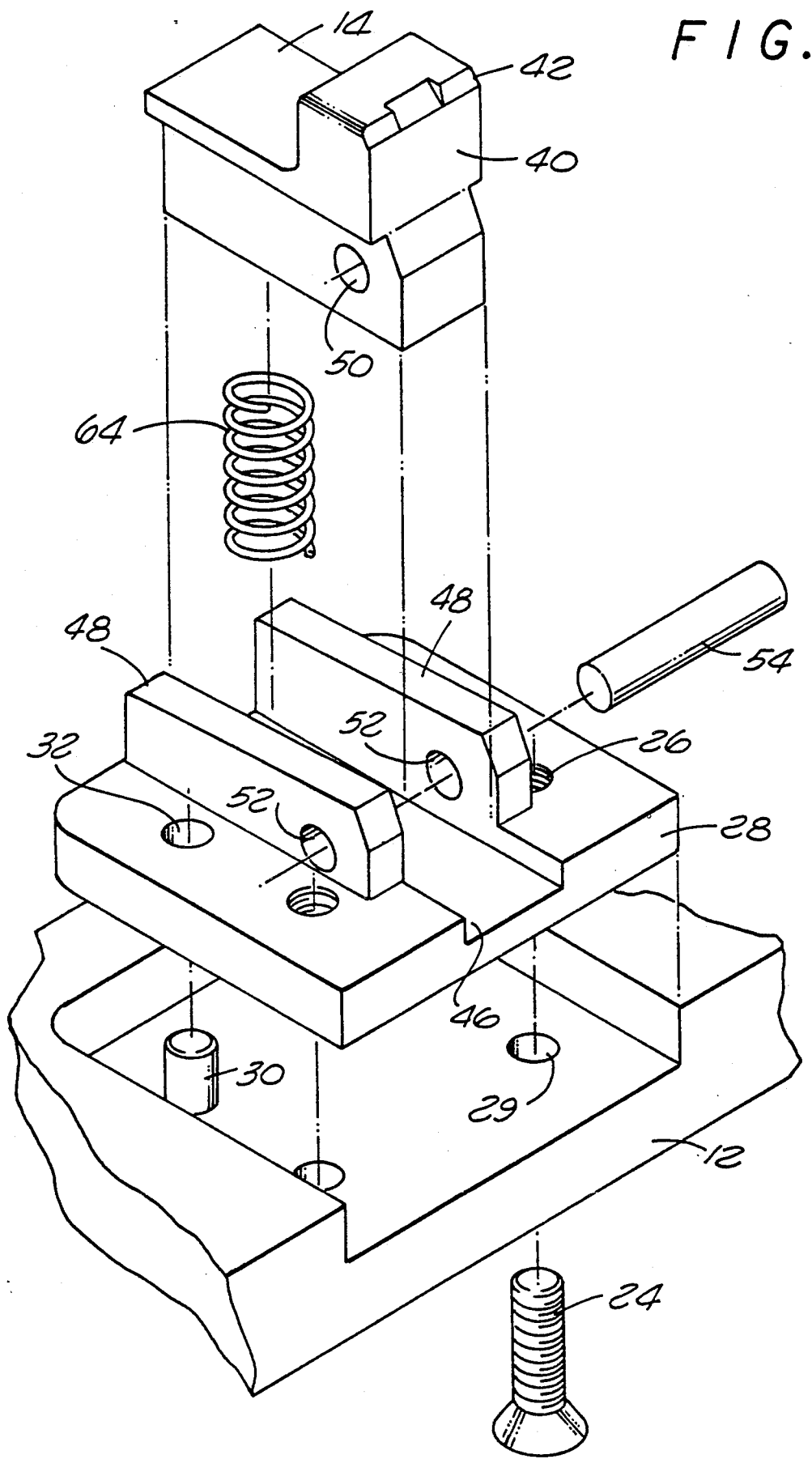

METHOD FOR FORMING AN OPENING IN A CONTAINER

This is a divisional of application Ser. No. 07/698,628, filed May 10, 1991, now U.S. letters Pat. No. 5,162,123.

FIELD OF THE INVENTION

The present invention relates generally to a mold used for forming a container with a latch opening, from a deformable material. More specifically, the present invention relates to a spring-oriented rotary shear key for use in such a mold.

BACKGROUND OF THE INVENTION

Molded plastic containers, more specifically, containers molded from expanded organic polymer material, are available in different shapes and sizes for packaging a variety of fragile articles, such as eggs, light bulbs and the like. Such containers are particularly useful to protect the fragile articles from impact, changes in temperature and other adverse environmental effects.

The technique for forming such containers, well known in the industry, involves heating a wide, continuous sheet of plastic material to soften it for molding. The softened sheet is then advanced repeatedly in between the upper and lower portions of multi-cavity molds and the mold portions are pressed together against the softened sheet to form the containers. When pressed together, the mold portions are cooled to fix the plastic in its molded shape. The mold portions are then separated and the process is repeated a number of times.

A majority of the containers have a cover that latches over a base portion of the container. Such containers utilize latching arrangements which must withstand rough and rapid handling, or repeated opening and closing. A simple yet effective latching arrangement is obtained by providing a latch, extending outwardly from or adjacent to one edge of either the cover or base portion, which is insertable into an opening provided in the other portion. The latch can be a flat tab, a round protuberance or the like.

In early methods, latch openings were formed in a separate punching process after the cartons were molded. This separate process required additional equipment and labor, thereby increasing the cost of manufacturing such containers.

Subsequent methods, such as described in U.S. Pat. No. 3,845,187, eliminate the separate punching process. The latch opening is formed during the molding process itself. As the mold portions close, the softened sheet of plastic is stretched over a die surface on one of the mold portions, and a hole former carried by the other mold portion is pressed into contact with the die surface to cut through the plastic along one edge of the latch opening. As the mold portions close further, resilient means are used to cause the hole former to scrape along the die surface and push the plastic across a scraped region, away from the cut, to form a compressed wall of plastic spaced from the cut to form the latch opening. However, the requirement that the hole former be in contact with the die surface, when it cuts through the plastic sheet, necessitates periodic sharpening or replacement of its dulled or blunted cutting edge.

Another method utilizes a heavy spring top-loaded onto a rotary shear key to obliquely bias the key surface and resist the horizontal vector of the downward travel of the hole former upon this surface. Again, this results in a considerable scraping action between the hole former and the key surface and misalignment of the key.

SUMMARY OF THE INVENTION

The present invention also uses a spring with a rotary shear key but the spring is lightly loaded onto the rotary shear key, preferably at the bottom, to simply orient the rotary shear key. The rotary shear key is used in a mold that has upper and lower mold portions with die surfaces disposed facing each other and configured to press the sheet of deformable material therebetween into a container. An upper shear key and a lower rotary key, each having a shear surface, are mounted in the upper and lower mold portions, respectively, such that the shear surfaces face each other to form an opening in the container as the mold portions are pressed together.

In accordance with a preferred embodiment of the present invention, the lower rotary key is configured to closely contact the upper shear key, without causing breakage of the keys as a result of misalignment, and to reduce wear of the shear surfaces. The lower rotary key of the present invention completely and neatly removes the deformable material at the location where the latch opening is formed. The lower rotary key is mounted such that its shear surface rotates on an axis normal to the path of travel of the mold portions.

More particularly, the lower rotary key pivotally rotates up and down about a pivot pin extending horizontally therethrough. The upper shear key travels downwardly and engages a chamfer on the top edge of a lower rotary key, causing the lower rotary key to rotate around the pivot pin so that the upper shear key travelling vertically downwardly can clear and thereafter realign with the confronting surface of the lower shear key. The lower rotary key is oriented, i.e., positioned substantially vertically by the spring which allows the lower rotary key to return to its original position and realign itself.

BREIF DESCRIPTION OF THE DRAWINGS

A preferred embodiment of the present invention is illustrated in and by the following drawings in which like reference numerals indicate like parts and in which:

FIG. 3 is an exploded view, of a portion of the lower rotary key of FIG. 1, illustrating the assembly thereof.

DETAILED DESCRIPTION OF THE PREFERRED EMBODIMENT

Figure 1:
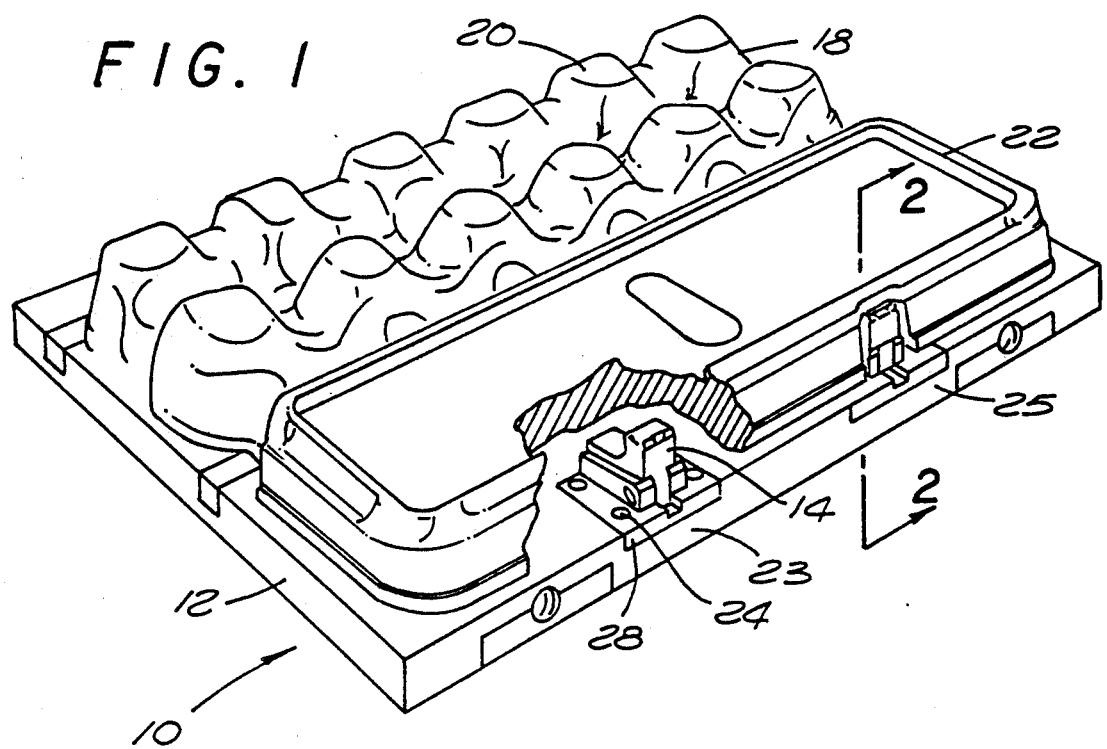
FIG. 1 is a perspective view, partially cut away, showing a lower mold portion of a mold for forming an egg carton incorporating a spring-oriented rotary shear key of the present invention.

FIG. 1 illustrates generally a mold 10 for forming a container, such as an egg carton (of similar configuration as the exemplary mold illustrated in FIG. 1) with a latch opening (not shown). The mold 10 incorporates a spring-oriented rotary shear key in accordance with a preferred embodiment of the present invention which is configured to closely contact the upper shear key (in substantially parallel alignment) to form the latch opening, without causing breakage of the keys as a result of misalignment, and to reduce wear of the shear surfaces of the upper and lower keys. The lower rotary key of the present invention completely and neatly removes the deformable material at the location where the latch opening is formed.

Typically, the mold 10 includes upper and lower mold portions formed with facing die surfaces. The facing die surfaces are suitably shaped to contour a sheet of deformable material inserted therebetween into the form of a container. Not shown, but well known to those skilled in the art, are means for supporting the mold portions; spaced apart from one another by a distance sufficient to permit the insertion of the sheet of deformable material, and means for pressing the mold portions toward one another along a vertical path of travel to form the container.

In particular, a lower portion 12 of the mold illustrated in FIG. 1 forms thermoplastic egg cartons with two latch openings in the lid of the cartons, at locations corresponding to the two spring-oriented rotary shear keys shown. The lower portion 12 is identical to a plurality of such portions in a bank of mold stations in a tandem arrangement. The mold stations are arranged to simultaneously form a plurality of containers between their facing surfaces. The containers are molded from a sheet of deformable material, such as organic polymer material, preferably an expanded organic polymer material, such as expanded polystyrene. The choice of a particular deformable material depends, in part, on the type of articles to be enclosed in the container.

The lower portion 12 has a lower rotary key 14 of the spring-oriented rotary shear key of the present invention mounted thereto. A corresponding upper portion (not shown) of the mold 10 presses against the lower portion 12, compressing the deformable material therebetween to form the container. The invention is illustrated with vertically shearing keys (keys having shear surfaces located in a plane parallel to the plane of the closing motion of the mold portions), but the invention also has application to obliquely disposed keys. The embodiment disclosed herein merely exemplifies the invention which may take forms that are different from the specific embodiment disclosed.

The lower portion 12 of the mold 10 comprises a base portion 18, having a plurality of depressions 20 to form the base of an egg carton, and a cover 22 to form the cover of the egg carton. Preferably, lower rotary key 14 and the upper shear key 34 are mounted at suitable locations on the mold where latch openings are desired. In the illustrated embodiment, the lower rotary key 12 is secured at one end 23 of the cover 22 to shear away a portion of the sheet of deformable material to form a latch opening, and an identical one is secured at another end 25. The lower rotary key 14 is secured to the lower mold portion 12 by bolts 24, which are received through threaded openings 29 in the lower mold portion 12 and through threaded holes 26 formed in the lower rotary key 14. Pins 30 extending from the lower mold portion 12 are press fit into corresponding bores 32 in the lower rotary key 14.

Figure 2:
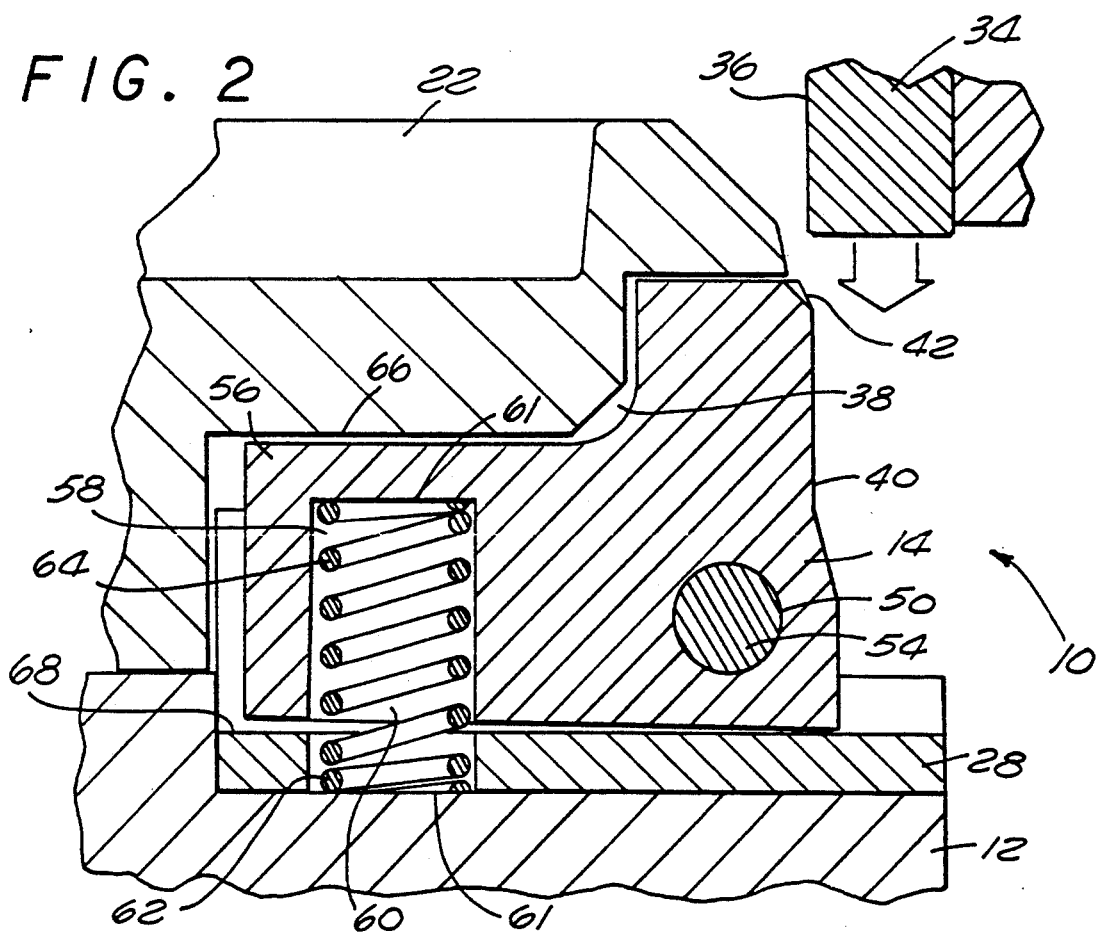
FIG. 2 is a cross-sectional view of a portion of FIG. 1, taken along line 2—2, showing a spring disposed in a cavity of the lower rotary key and of a portion of an upper shear key.

Referring now to FIG. 2, there is shown a portion of an upper shear key 34 and the lower mold portion 12. The upper shear key 34 affixed to an upper mold portion (not shown) has a flat shear surface 36, located in a plane parallel to the closing motion of the upper mold portion against the lower mold portion 12.

The lower rotary key 14 fits into a complimentary hollow chamber 38 formed within the lower mold portion 12. The dimensions of the hollow chamber 38 are such that the lower rotary key 14 is free to pivotally rotate within a predetermined range of angles.

The lower key 14 has a flat shear surface 40, located in a plane parallel to the plane of the closing motion of the mold. At the top of the shear surface 40 is a chamfered edge 42 which forms a leading edge extending and adjacent the width of the latch opening, as best shown in FIG. 3.

Referring now to FIGS. 2 and 3, the support 28 comprises a centrally located depression 46 having parallel guiding members 48 disposed on either side thereof. The lower rotary key 14 is received within the depression 46 between the guiding members 48 and has a bore 50 extending therethrough aligned with corresponding bores 52 formed in the parallel guiding members 48. A pivot pin 54 is received through bores 50 and 52 to pivotally mount the lower rotary key 14 to the support 28.

As best shown in FIG. 2, at an end 56, remote from the pin 54, the lower rotary key 14 has an upper half 58 of a cavity 60 formed therein aligned with a lower half 62 of the cavity 60 formed in the support 28. The cavity 60 extends along a vertical axis and is preferably cylindrical. A spring 64, preferably a coil spring, is disposed within the cavity 60 such that it contacts inner end surfaces 61 of the cavity 60.

The lower rotary key 14 rotates, or pivots up and down about the pin 54. The range of angles about which the lower rotary key 14 pivotally rotates is limited by an upper wall 66 of the chamber 38 and a surface 68 of the support 28. The spring 64 orients the lower rotary key 14 such that the lower rotary key 14 returns to its original position after rotating therefrom. The spring 64 preferably has a tension sufficient to ensure that the lower rotary key 14 returns to its original position and to cause the shear faces 40 and 36 to realign themselves.

During the molding operation, the upper shear key 34 travels downwardly, indicated by the arrow shown in FIG. 2, and engages the chamfer 42, causing the lower rotary key 14 to pivotally rotate around the pin 4 so that the upper shear key 34, travelling vertically downwardly can clear and thereafter realign itself with the shear surface 40 of the lower shear key 14. The shear surfaces 36 and 40 are spaced apart from one another by a distance which is less than the width of the sheet of the deformable material which facilitates slidable contact of the shear surfaces 36 and 40.

The lower rotary key 14 advantageously facilitates ease of assembly and disassembly should a part wear out or become damaged. The lower rotary key 14 allows the orientation of the shear surfaces 36 and 40 to be more readily aligned and stay aligned for longer periods of time. Consequently, the accuracy of the formation of the latch opening is increased and the frequency required for sharpening or replacing the keys is substantially reduced in contrast to prior keys.

Although the invention has been described in terms of a preferred embodiment thereof, other embodiments that are apparent to those of ordinary skill in the art are also within the scope of the invention. Accordingly, the scope of the invention is intended to be defined only by reference to the appended claims.

What is claimed is:

1. A method for forming a container with a latch opening from a sheet of deformable material, by using a mold having upper and lower mold portions that move toward each other to define a path of travel, comprising the steps of:

mounting an upper shear key having a first shear surface to the upper mold portion;

mounting a lower key having a second shear surface to the lower mold portion on a pivot axis normal to the path of travel such that said first and second shear surfaces face each other in parallel alignment;

advancing said upper shear key toward said lower key along the path of travel to press against the sheet of deformable material; and spring orienting said lower key whereby to rotate said second shear surface of said lower key about said pivot axis to slideably contact said first shear surface of said upper shear key and form the latch opening as the upper and lower keys slidably contact each other.

2. A method for forming a container with a latch opening from a sheet of deformable material, by using a mold having upper and lower mold portions that move toward each other along a path of travel, comprising the steps of:

mounting an upper shear key having a first shear surface to the upper mold portion;

mounting a lower key having a second shear surface to the lower mold portion on a pivot pin extending along an axis normal to the path of travel such that said first and second shear surfaces face each other in parallel alignment;

advancing said upper shear key toward said lower key along the path of travel to press against the sheet of deformable material; and spring orienting said lower key whereby to rotate said second shear surface of said lower key about said pivot pin to slideably contact said first shear surface of said upper shear key and form the latch opening as the upper and lower keys slidably contact each other.

* * * * *